US008762006B2

(12) United States Patent
Miller

(10) Patent No.: US 8,762,006 B2
(45) Date of Patent: Jun. 24, 2014

(54) FAIL SAFE OPERATIONAL STEERING SYSTEM FOR AUTONOMOUS DRIVING

(75) Inventor: Joseph D. Miller, Farmington Hills, MI (US)

(73) Assignee: Kelsey-Hayes Company, Livonia, MI (US)

( * ) Notice: Subject to any disclaimer, the term of this patent is extended or adjusted under 35 U.S.C. 154(b) by 189 days.

(21) Appl. No.: 13/389,897

(22) PCT Filed: Aug. 19, 2010

(86) PCT No.: PCT/US2010/045963
§ 371 (c)(1),
(2), (4) Date: Feb. 23, 2012

(87) PCT Pub. No.: WO2011/022528
PCT Pub. Date: Feb. 24, 2011

(65) Prior Publication Data
US 2012/0136540 A1 May 31, 2012

Related U.S. Application Data

(60) Provisional application No. 61/235,047, filed on Aug. 19, 2009.

(51) Int. Cl.
*B62D 6/00* (2006.01)
(52) U.S. Cl.
USPC .......................................... 701/43; 180/402
(58) Field of Classification Search
USPC ......... 701/41, 42, 43; 708/534; 714/3, 10, 11, 714/12, 13; 180/402
See application file for complete search history.

(56) References Cited

U.S. PATENT DOCUMENTS

| 6,134,491 | A | 10/2000 | Kawagoe et al. |
| 6,324,452 | B1 | 11/2001 | Ikegaya |
| 6,394,218 | B1 | 5/2002 | Heitzer |
| 7,222,008 | B2 | 5/2007 | Takahashi et al. |
| 7,331,642 | B2 | 2/2008 | Miller |

FOREIGN PATENT DOCUMENTS

| EP | 1512609 A1 | 3/2005 |
| EP | 2055599 A1 | 5/2009 |
| EP | 2070803 A1 | 6/2009 |
| WO | 2008153162 A1 | 12/2008 |

OTHER PUBLICATIONS

European Search Report, Application No. EP10810581.8 dated Jan. 23, 2013.

*Primary Examiner* — Khoi Tran
*Assistant Examiner* — Adam Mott
(74) *Attorney, Agent, or Firm* — MacMillan, Sobanski & Todd, LLC

(57) ABSTRACT

This invention refers to an electrically assisted steering system that includes a torque sensor connected to a vehicle steering wheel. The system also includes a torque control ECU that is responsive to torque signals from the torque sensor to generate a motor assist requirement signal. The system further includes a motor control ECU responsive to the motor assist requirement signal to generate a motor control signal. The system additionally includes a steering assist motor responsive to the motor control signal to provide a steering assistance torque to the vehicle steering system. Finally, the system includes a safety domain ECU connected to at least one vehicle operational parameter sensor to generate a torque signal and send the same signal to the torque control ECU. The safety domain ECU is also being in communication with the torque control ECU and the Motor control ECU.

15 Claims, 6 Drawing Sheets

FAIL SAFE OPERATIONAL STEERING SYSTEM FOR AUTONOMOUS DRIVING

CROSS-REFERENCE TO RELATED APPLICATIONS

This application is the National Phase of International Application PCT/US2010/045963 filed Aug. 19, 2010, which designated the U.S. and that International Application was published in English under PCT Article 21(2) on June claims priority to U.S. Provisional Application No. 61/235,047, filed Aug. 29, 2009. The disclosures of both applications are incorporated herein by reference.

BACKGROUND OF THE INVENTION

This invention relates in general to vehicle steering systems and in particular to integration of a fail safe electrically assisted steering system with an autonomous driving system.

Referring now to FIG. 1, there is shown a typical electrically assisted steering system 8 as described in U.S. Pat. No. 6,394,218. The steering system 8 contains a steering spindle 10 having a longitudinal axis L and that is capable of performing a translatory movement in a casing 12. Connected to the steering spindle 10 is a steering linkage (not shown) leading to the steerable wheels of a vehicle.

The translatory movement of the steering spindle 10 in the casing 12 is achieved by means of a recirculating ball nut 14 which may be driven by two positioners 16 disposed in sequence in the interior of the casing 12. Each positioner 16 comprises a servomotor 18 including a rotor 20. The rotors 20 of the servomotors 18 are arranged on a common drive spindle 22 which is non-rotatably connected to the recirculating ball nut 14. The drive spindle 22 together with the rotors 20 is arranged concentrically to the steering spindle 10.

Each positioner 16 also includes a position sensor 24 capable of sensing the rotational position of the corresponding rotor 20. The servomotor 18 and the sensor 24 of each positioner 16 are encapsulated so that a defect in any one servomotor 18 cannot be detrimental to the functioning of the other. Additionally, each positioner 18 is electrically connected to an Electronic Control Unit (ECU) 26 serving to provide control signals to the corresponding servomotor 18. For this purpose each of the ECU's 26 is provided with a supply voltage V so that each servomotor 18 can be supplied with the necessary current.

Also housed in the casing 12 is a position sensor 27 capable of sensing a specific position of the steering spindle 10, for example, its center position. The ECU 26 is able to determine the actual position of the steering spindle in each case on the basis of the signal furnished by the position sensor 27 in conjunction with the signal furnished by the corresponding position sensor 24.

Control of each servomotor 18 occurs in accordance with information made available to the associated ECU 26. For example, each ECU 26 receives a signal from the position sensor 24 indicating the rotational position of the servomotor rotor 20. The ECU 26 further receives a signal from a control unit 28 indicating the setpoint position of the steering spindle 10. This setpoint value is established by the control unit as a function of external parameters, for example, depending on the setpoint value of a steering angle made available by a steering angle sensor for the vehicle steering wheel. The control unit 28 receives, in turn, signals representing the force acting in the steering spindle 10 and thus permits conclusions as to the cornering force acting on the steerable vehicle wheels.

Unlike error tolerant systems in which a mechanical connection is typically provided between the steering wheel and the steering spindle, forming a fall-back should any component of the steering system develop a fault, the steering system 8 is configured to include redundancy. Should one of the servomotors become defective the other servomotor is still able to ensure continuing steerability of the vehicle as long as it is on the move. Should one of the position sensors 24 become defective the remaining sensor is still able to furnish the required information. Likewise, should one of the ECU's 26 fail, the remaining ECU will continue to provide control signals to its corresponding servomotor 18.

New systems for directional control of vehicles are being continuously developed. These systems may be autonomous in that they may implement control actions in response to sensor inputs and independently of the vehicle operator. Some autonomous systems may implement vehicle directional control through the vehicle steering system and/or brake system. Accordingly, when a vehicle includes electrically assisted steering, it would be desirable to integrate autonomous directional control systems that involve the vehicle steering system with the steering system in order to reduce the over-all complexity of the vehicle. It also would be desirable to reduce the complexity and number of components required for the electrically assisted steering system.

SUMMARY OF THE INVENTION

This invention relates to an integration of a fail safe electrically assisted steering system with an autonomous driving system.

The invention contemplates an electrically assisted steering system that includes a torque sensor adapted to be connected to a vehicle steering wheel. The system also includes a torque control device that is connected to the torque sensor and responsive to torque signals received from the torque sensor to generate a motor assist requirement signal. The system further includes a motor control device connected to the torque control device and responsive to the motor assist requirement signal to generate a motor control signal. The system additionally includes a steering assist motor connected to the motor control device, the steering assist motor adapted to be connected to a vehicle steering system and responsive to the motor control signal to provide a steering assistance torque to the vehicle steering system. Finally, the system includes a safety domain device connected to at least one vehicle operational parameter sensor. The safety domain device also being connected to the torque sensor and in communication with the torque control ECU and the Motor control device. The safety domain ECU device being responsive to signals received from the operational parameter sensor to generate a torque signal and send same to the torque control device.

The invention also contemplates a method for operating an electrically assisted steering system that includes using a torque control device to generate a torque signal that is a function of a steering wheel torque and a signal received from a safety domain device. The method further includes generating a motor control signal as a function of the torque signal and sending the motor control signal to a steering assist motor that is included in the electrically assisted steering system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
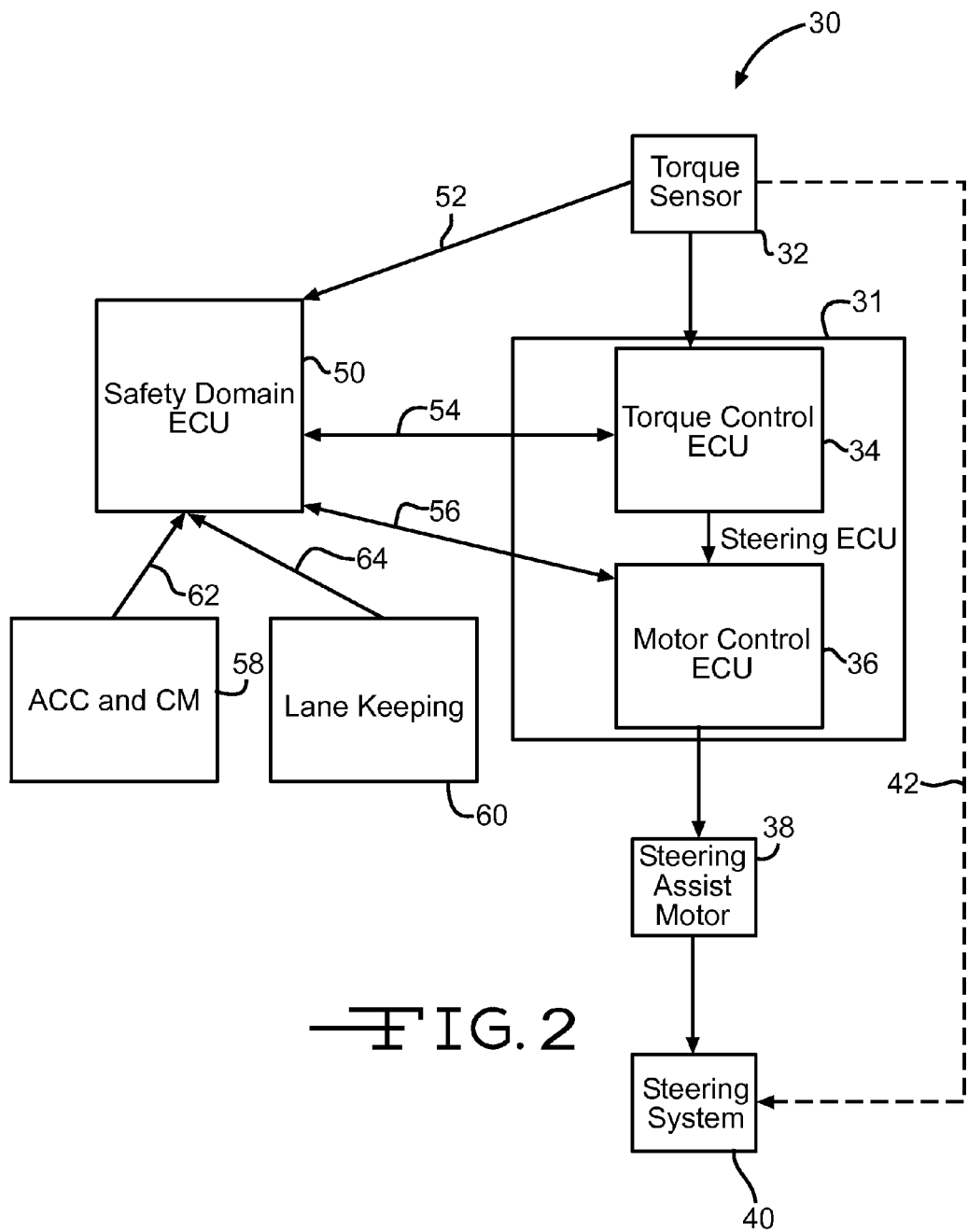
FIG. 2 represents the present system where a Safety Domain ECU is connected to a single Steering ECU which includes a Torque Control ECU and a Motor Control ECU. The figure illustrates all available communication paths. The dashed path to the right of the figure represents the manual backup if the systems fail.

Referring again to the drawings, there is illustrated in FIG. 2 an electrically assisted steering system 30 that is in accordance with the present invention. The steering system 30 includes a torque sensor 32 that is connected to a vehicle steering wheel (not shown) and is operative to generate a torque signal in response to the vehicle operator running the steering wheel. The torque sensor 32 is connected to a steering ECU 31 that includes to a torque control ECU 34 a motor control ECU 36. As shown in FIG. 2, the torque sensor 32 provides the torque signal to the torque control ECU 34. The torque control ECU 34 is responsive to the torque signal to generate a motor assist requirement signal. The motor assist requirement signal is supplied to the motor control ECU 36 which then generates specific electrical steering motor control signals that are supplied to a steering assist motor 38. While two separate ECU's 34 and 36 are shown within the steering ECU 31, it will be appreciated that the invention also may be practiced with a single ECU containing two microprocessors (not shown). One of the microprocessors would function as the torque control unit 34 while the other microprocessor would function as the motor control ECU 36. In a similar manner, the invention also contemplates that the torque control function and the motor control functions may be provided in separate discrete ECU's (not shown) instead being contained within the steering ECU 31 as shown in FIG. 2. Such an embodiment could be combined with use of AUTomotive Open System ARchetecture (AUTOSAR) to further enhance system performance. The steering assist motor 38 is responsive, in turn, to the steering motor control signals to provide steering assist torque to the vehicle steering system 40. The system 30 also includes a back-up steering connection 42 that mechanically links the vehicle steering wheel to the steering system 40, as shown by the dashed lines in FIG. 2. The dashed lines indicate that the back-up system 40 is disengaged during normal operation of the system 30.

Figure 1:
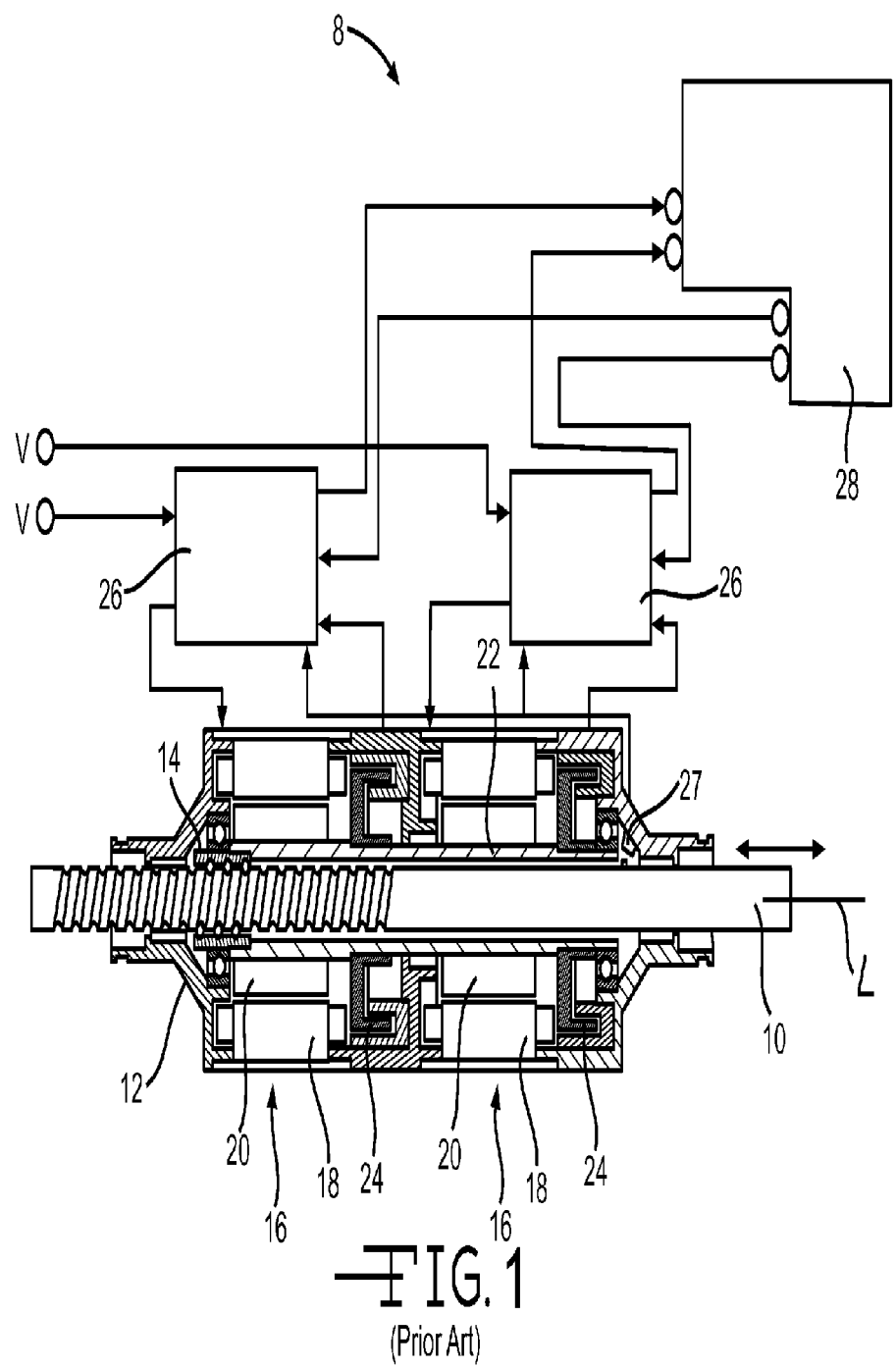
FIG. 1 illustrates a prior art electrically assisted steering system with a redundant steering ECU.

As shown in FIG. 2, the system 30 includes a single steering ECU 31 that is divided into a torque control ECU 34 and a motor control ECU 36 in place of the pair of prior art ECU's 26 shown in FIG. 1. The mechanical back-up steering connection 42 replaces the redundant prior art ECU. While the torque control ECU 34 and the motor control ECU 36 of the present invention replace one of the prior art ECU's 26, the overall system complexity is reduced by the elimination of the redundant prior art ECU 26.

The invention also contemplates that the steering control system 30 is integrated with other vehicle directional control systems. As shown in FIG. 2, the present invention contemplates including a Safety Domain ECU in the electrically assisted steering system 30. The Safety Domain ECU 50 receives torque signals from the torque sensor 32, as shown by the arrow labeled 52. As will be explained below, the Safety Domain ECU 50 also may receive and send signals to the torque control unit 34 and the motor control ECU 36, as shown by the double headed arrows labeled 54 and 56, respectively. Additionally, the Safety Domain ECU 50 receives signals containing vehicle operational data from an Adaptive Cruise Control (ACC) and Collision Mitigation (CM) data module 58 and a Lane Keeping data module 60, as shown by the arrows labeled 62 and 64, respectively. The ACC portion of the ACC and CM module 58 includes sensors, such as redundant radar sensors, that provide data for autonomously varying the setting to the cruise control to maintain a safe distance from a preceding vehicle while the CM portion supplies data for application of the vehicle brakes autonomously if a collision is imminent. The Lane Keeping module 60 utilizes sensors, such as redundant optical sensors, that track lane markings and that identify the object ahead as a vehicle, to provide data for autonomously keeping the vehicle in the present lane by steering the vehicle independently of the operator. The Lane Keeping module 60 is currently intended for use in free flowing traffic on limited access freeways; however, the application of the module may be expanded to other traffic situations in the future. The Lane Keeping module 60 also may include autonomous lane changing when requested by the vehicle operator and further may include a vehicle operator monitoring system. Other optional features for The Lane Keeping module 60 may include a lane departure warning, a lane change warning and a side blind zone alert. While two data modules 58 and 60 are shown in FIG. 2 providing data to the Safety Domain ECU 50, it will be appreciated that the invention also may be practiced with more or less data modules than shown. Additionally, while the ACC and CM module 58 is illustrated as including both an ACC portion and a CM portion, it will be appreciated that the invention also may be practiced with only one the two portions or that the two portions may be placed in separate modules (not shown). In a similar manner, the functions of the Safety Domain ECU 50 may be distributed among other vehicle ECU's, such as, for example, a Passive Safety Airbag ECU (not shown). Again, such distribution of functions could be combined with use of AUTomotive Open System ARchetecture (AUTOSAR) to further enhance system performance.

Figure 3:
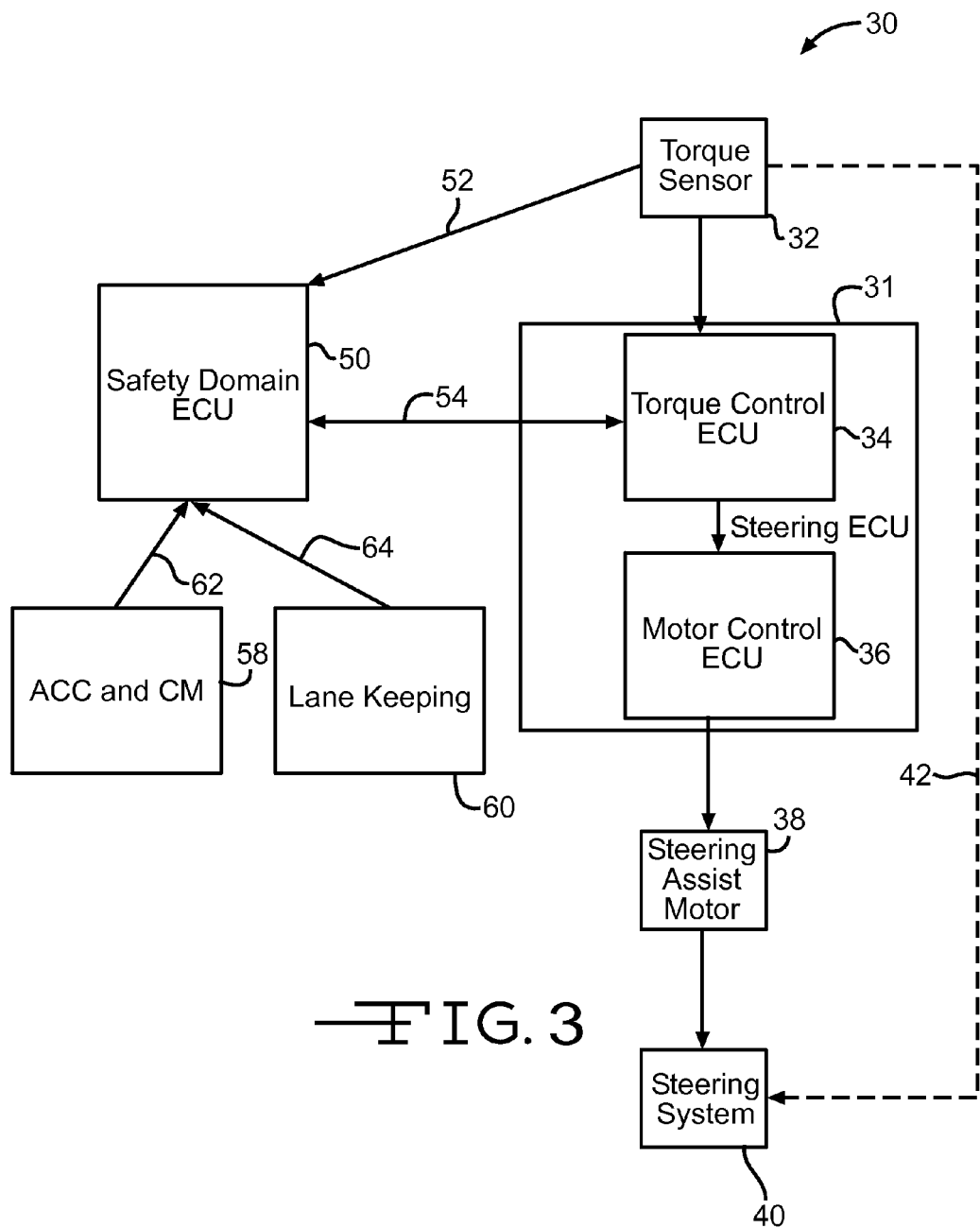
FIG. 3 illustrates normal operation of the system shown in FIG. 2 with the Safety Domain ECU providing control of the steering through the Torque Control ECU.

The operation of the system 30 will now be described in light of FIGS. 3 through 5, in which components that are similar to components shown in FIG. 2 have the same numerical identifiers. FIG. 3 illustrates a normal mode of operation for the system 30. The Safety Domain ECU 50 is responsive to inputs from the torque sensor 32, the torque control ECU 34, the ACC and CM data module 58 and the Lane Keeping Module 60 to generate torque signals that are sent to the torque ECU 34. The torque ECU 34 is responsive, in turn, to the torque signals form the Safety Domain ECU 50 to cause the motor control ECU 36 to generate specific electrical steering motor control signals that are supplied to the steering assist motor 38. It will be noted that the connection between the Safety Domain ECU and the motor control ECU 36 is inactive during normal mode operation, as indicated by the omission of the double headed arrow 54 from FIG. 3.

Figure 4:
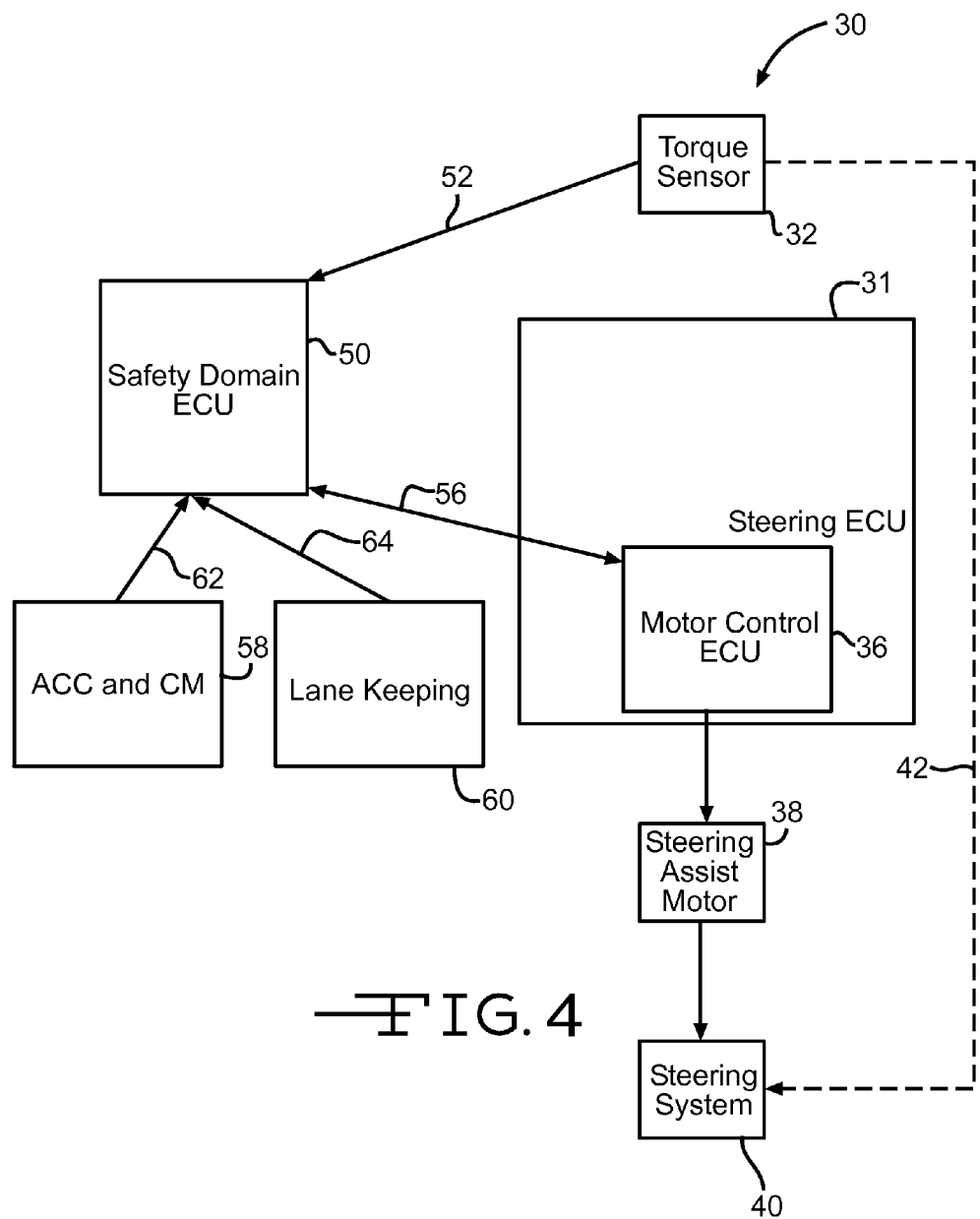
FIG. 4 illustrates operation of the system shown in FIG. 2 if the Torque Control ECU fails with the Safety Domain ECU providing control of the steering through the Motor Control ECU.

Should the torque control ECU 34 become inoperative, the system adopts the mode of operation shown in FIG. 4, where the torque control ECU has been omitted. The Safety Domain ECU 50 continues to receive inputs from the torque sensor 32, the ACC and CM data module 58 and the Lane Keeping Module 60. The Safety Domain ECU 50 also receives data from the motor control ECU 36, as shown by the double headed arrow 56 while communication with the torque control ECU 34 has been terminated, as shown by the omission of the double headed arrow 54 from the figure. The Safety Domain ECU 50 is responsive to the data received from the torque sensor 32, the ACC and CM data module 58 and the Lane Keeping Module 60 to generate motor control signals that are sent directly to the motor control ECU 36. The motor control ECU 36 then generates specific electrical steering motor control signals that are supplied to the steering assist motor 38. The system 30 continues to operate in this mode as long as the vehicle steering wheel is not turned.

Figure 5:
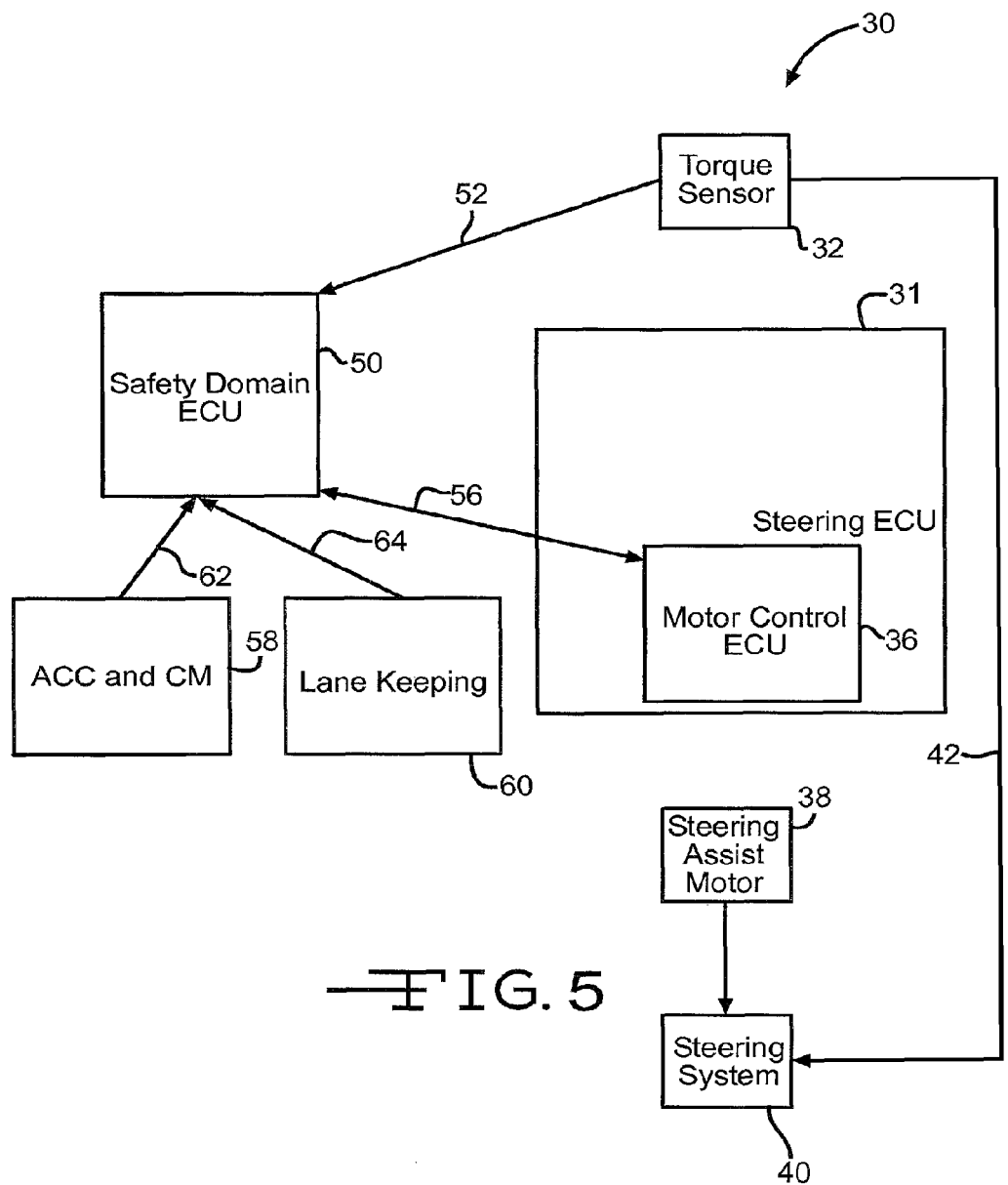
FIG. 5 illustrates operation of the system shown in FIG. 4 with transfer of control to the manual backup if torque from the hand-wheel is sensed.

Should the steering wheel be turned while the torque control ECU 34 is inoperative, the system 30 enters the mode of operation shown in FIG. 5. Upon sensing the turning the steering wheel via the torque sensor 30, the Safety Domain ECU 50 is deactivated and the link between the motor control ECU 36 and the steering assist motor 38 is severed, as shown in FIG. 5 by the removal of the arrow joining the two components. Manual control of the steering by the vehicle operator is provided by engagement of the back-up steering connection 42, which is shown by the solid arrow in FIG. 5. Additionally, a warning is provided to the vehicle operator that the manual control has been engaged. The warning may be visual and/or auditory, such as, for example, sounding of a gong, illumination of a warning light and/or displaying a text message. The invention also contemplates providing a similar warning to the vehicle operator upon detection of a fault in the torque control ECU 34 and switching to a direct link between the Safety Domain ECU 50 and the motor control ECU 36, as shown in FIG. 4.

Figure 6:
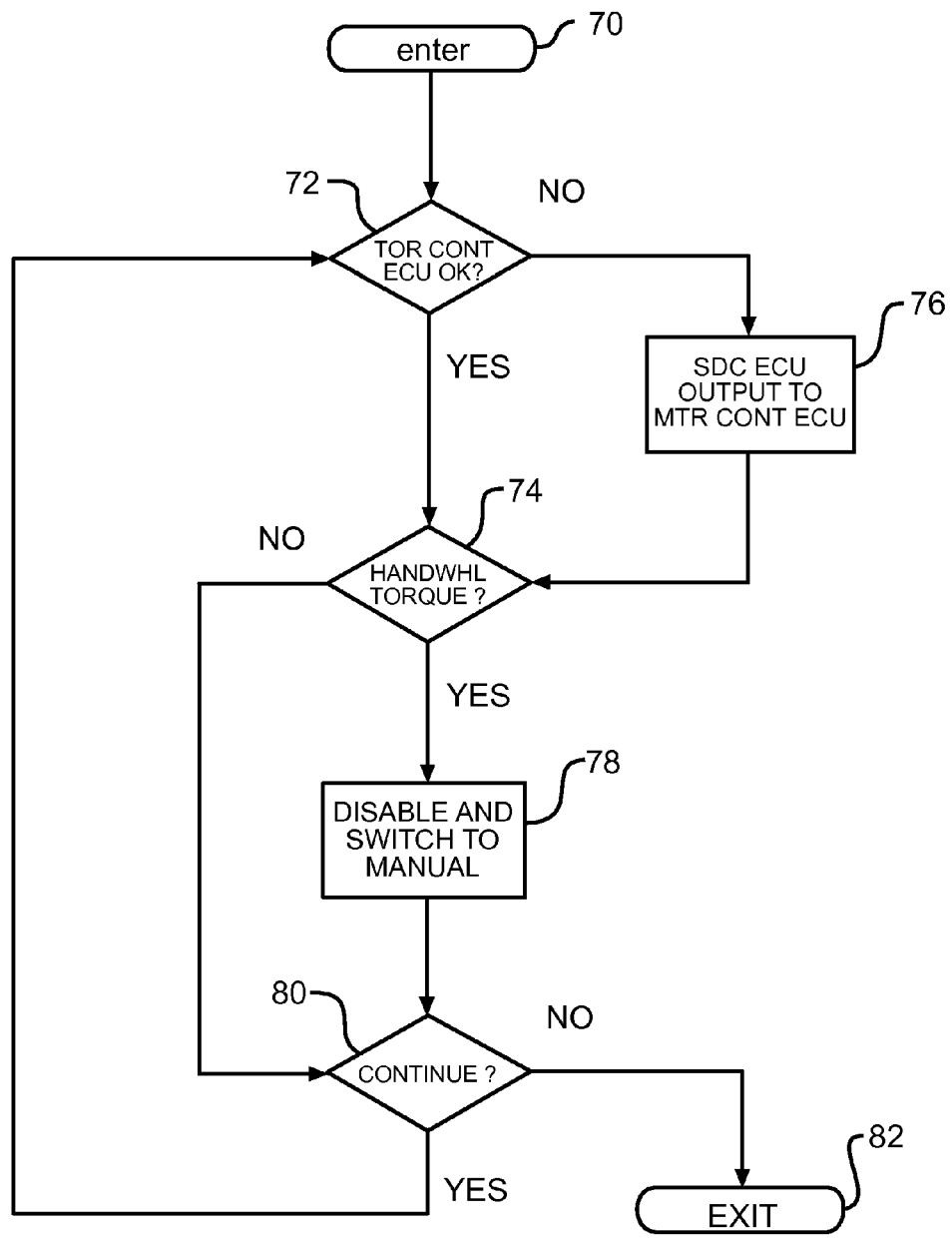
FIG. 6 is a simple flow chart illustrating the operation of the system shown in FIG. 2.

The invention also contemplates that the operation of the system is controlled with an algorithm that is illustrated by the flow chart shown in FIG. 6. The algorithm is entered through block 70 and proceeds to decision block 72 where the torque control ECU 34 is checked for proper operation. If the torque control ECU 34 is operating properly, the algorithm transfers to decision block 74. If the torque control ECU 34 is not operating properly, the algorithm transfers to functional block 76 where motor assist requirement signals are generated by the Safety Domain ECU 50 and are then redirected to the motor control ECU 36, as illustrated in FIG. 4. The algorithm then continues to decision block 74.

In decision block 74 the torque sensor 32 is checked for movement of the vehicle steering wheel. If movement of the vehicle steering wheel is detected in decision block 74, the algorithm transfers to functional block 78 where the system is disabled and the mechanical back-up connection 42 is engaged to provide steering control for the vehicle, as illustrated in FIG. 5. The algorithm then continues to decision block 80. If movement of the vehicle steering wheel is not detected in decision block 74, the algorithm transfers directly to decision block 80.

In decision block 80, if it is determined whether or not to continue operation of the algorithm. The invention contemplates that the determination to continue would be based upon an operational condition of the vehicle, such as, for example, the ignition continuing to be on. If, in decision block 80, it is determined to continue, the algorithm transfers back to decision block 72 and starts another iteration. If, in decision block 80, it is determined to not continue, the algorithm transfers to block 82 and exits.

It will be appreciated that the algorithm illustrated by the flow chart shown in FIG. 5 is intended to be exemplary and that the invention also may be implemented with algorithms that differ from the one shown in the figure.

The present invention also contemplates that the fail safe operational strategy described above may be continued until a further latent failure is detected, such as, for example, at start-up or during a run-time test. Thus, for autonomous safety related functions, a required integrity level can be achieved. The integration of functionality within fewer ECU's, as contemplated by the present invention, provides a potential for diverse redundancy within independent functions, or integrated items. Additionally, the reduction of the number and complexity of the required ECU's results in a system having the lowest cost of implementation. The present invention also may be easily adapted to support continuing development and addition of autonomous vehicle systems.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electrically assisted steering system for a vehicle comprising:
   a torque sensor adapted to be connected to a vehicle steering wheel;
   a torque control device connected to said torque sensor and responsive to torque signals received from said torque sensor to generate a motor assist requirement signal;
   a motor control device connected to said torque control device and responsive to said motor assist requirement signal to generate a motor control signal;
   a steering assist motor connected to said motor control device, said steering assist motor adapted to be connected to a vehicle steering system, said steering assist motor responsive to said motor control signal to provide a steering assistance torque to said vehicle steering system; and
   a safety domain device connected to at least one vehicle operational parameter sensor, said safety domain device also connected to said torque sensor and in communication with said torque control device and said motor control device, said safety domain device responsive to signals received from said operational parameter sensor to generate a second torque signal and send same to said torque control device,
   wherein the system checks upon the operation of the torque control device and, upon determining that the torque control device is not operational, control of said motor control device is transferred to said safety domain device.

2. The steering system according to claim 1 further including a back-up mechanical connection between said torque sensor and the vehicle steering system, the steering system being operational, upon receiving an indication that the vehicle steering wheel has been rotated by the vehicle operator, to disable the system and transfer vehicle steering control to said back-up mechanical connection.

3. The steering system according to claim 2 wherein said torque control device is included in a torque control ECU and further wherein said motor control device is included in a motor control ECU.

4. The steering system according to claim 3 wherein said safety domain device is located in a safety domain ECU and further wherein said torque control ECU and said motor control ECU are both located in a steering control ECU.

5. The steering system according to claim 3 wherein said safety domain device is located in another vehicle ECU and further wherein said torque control ECU and said motor control ECU are both located in a steering control ECU.

6. The steering system according to claim 2 wherein said torque control device includes a first microprocessor that is located in a torque control ECU and further wherein said motor control device includes a second microprocessor that is located in a motor control ECU.

7. The steering system according to claim 6 wherein said safety domain device includes a third microprocessor that is located in a safety domain ECU and further wherein said torque control microprocessor and said motor control microprocessor are both located in a steering control ECU.

8. The steering system according to claim 6 wherein said safety domain includes a third microprocessor that is located in another vehicle ECU and further wherein said torque control microprocessor and said motor control microprocessor are both located in a steering control ECU.

9. The steering system according to claim 2 wherein said operational parameter sensor is active to provide information regarding operation of one of an adaptive cruise control device, a collision mitigation device and a lane keeping device.

10. The steering system according to claim 2 wherein said system components are connected with automotive open system architecture.

11. A method for controlling an electrically assisted steering system comprising the steps of:
(a) using a torque control device to generate a torque signal that is a function of a steering wheel torque and a signal received from a safety domain device;
(b) generating a motor control signal as a function of the torque signal; and
(c) sending the motor control signal to a steering assist motor that is included in the electrically assisted steering system, wherein
(d) the system checks upon the operation of the torque control device and, upon determining that the torque control device is not operational, causes the safety domain device to generate the motor control signal to the steering assist motor.

12. The method according to claim 11 wherein the safety domain device signal in step (a) is a function of the steering wheel torque and signals received from at least one operational parameter sensor.

13. The method according to claim 12 wherein the operational parameter sensor is active to provide information regarding operation of one of an adaptive cruise control device, a collision mitigation device and a lane keeping device.

14. The method according to claim 12 further including monitoring the operation of the torque control device and, upon determining that the torque control device is no longer operational, generating a second torque signal that is only a function of the signal received from the safety domain device.

15. The method according to claim 14 further including monitoring the steering wheel for movement and, upon detecting movement of the steering wheel, disabling the electrically assisted steering system and transferring steering control to a back-up mechanical connection between the steering wheel and the steerable wheels.

* * * * *